United States Patent

[11] 3,599,424

| [72] | Inventor | Jack S. Yampolsky<br>San Diego, Calif. |
| [21] | Appl. No. | 764,530 |
| [22] | Filed | Oct. 2, 1968 |
| [45] | Patented | Aug. 17, 1971 |
| [73] | Assignee | Gulf Oil Corporation<br>San Diego, Calif. |

[54] POWER CONVERSION SYSTEM
16 Claims, 1 Drawing Fig.

| [52] | U.S. Cl. | 60/20 |
| [51] | Int. Cl. | F01b 21/00 |
| [50] | Field of Search | 60/20, 39.18 C |

[56] References Cited
UNITED STATES PATENTS
2,513,601  7/1950  Traupel ........................ 60/39.18 C FOREIGN PATENTS
645,693  11/1950  Great Britain .............. 60/20

Primary Examiner—Carroll B. Dority, Jr.
Attorney—Fitch, Even, Tabin and Luedeka

ABSTRACT: An improved power conversion system is provided for converting energy between thermal energy and mechanical energy which solves the problems of incompatibilities between the characteristics of input energy and desired output. A first subsystem is provided with first energy conversion means interacting in series with a first working fluid. A second subsystem is provided with second energy conversion units interacting in parallel with a second working fluid. Energy is transmitted between the two subsystems by a direct mechanical linkage between the output of the first conversion units and the second conversion units. A third energy conversion means converts energy between mechanical energy of the second working fluid and mechanical kinetic energy. Lubrication of the system is provided by the working fluids.

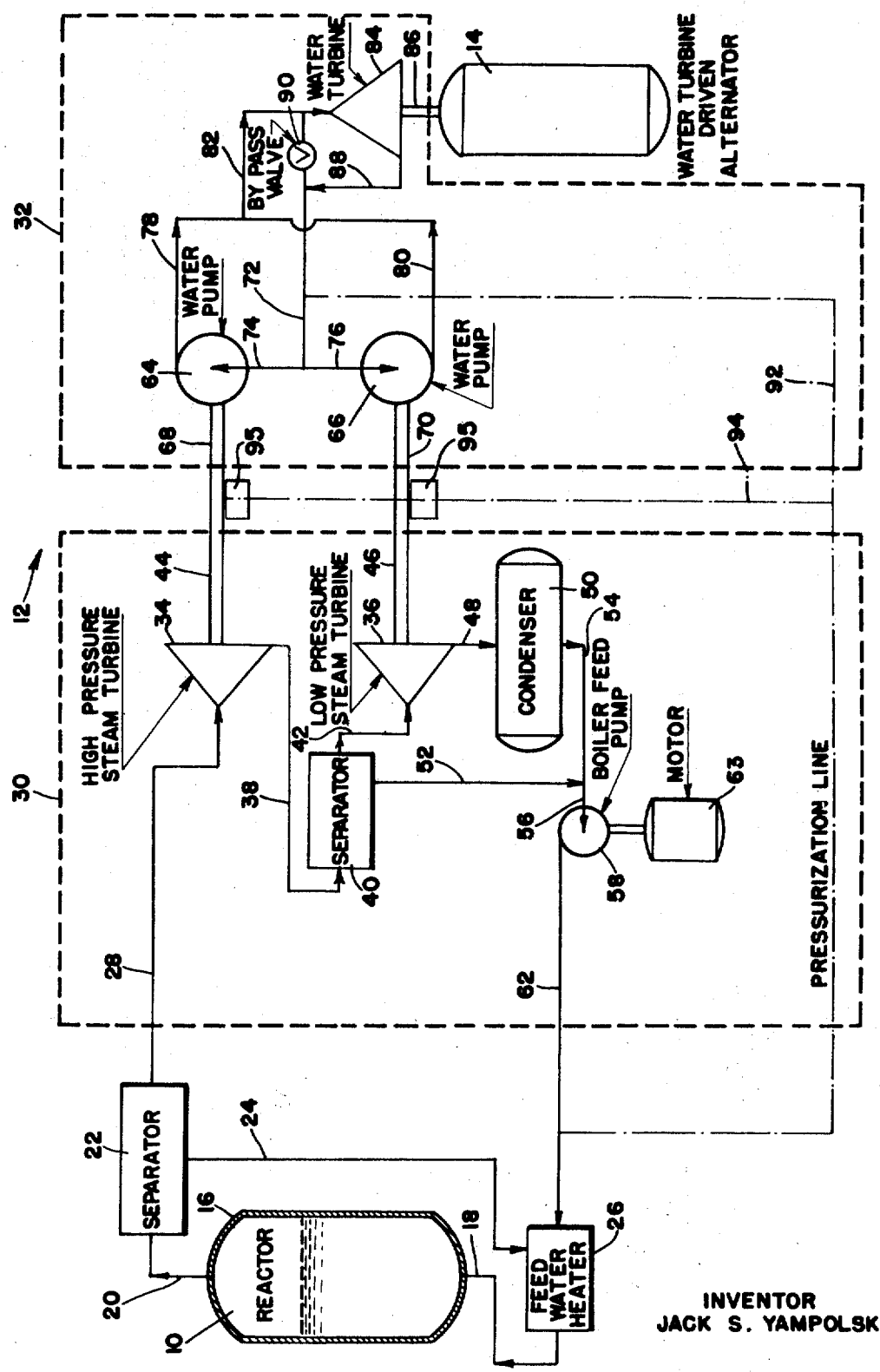

POWER CONVERSION SYSTEM

This invention relates to power conversion systems and, more particularly to a power conversion system especially adapted to overcome incompatibility between the characteristics of the energy which enters the system and the desired output.

In general power conversion systems functioning as prime movers transform energy from the form of thermal energy or pressure energy of a working substance into mechanical energy which may be used, for example, to generate electricity. Conversely, power conversion systems may be utilized to perform work on a substance by converting mechanical energy into thermal or internal energy, such as by compressing a gas. In some instances the characteristics of the energy which enters the system are incompatible with the desired output.

A specific example of such a situation has arisen in connection with the development of small power plants producing power at a level of the order of 1,000 kilowatts. Such power plants, when utilizing nuclear reactors as a heat source, may be extremely useful to produce electrical energy for lunar stations and orbiting space platforms as well as for terrestrial uses, such as Antarctic stations or auxiliary emergency power systems. It is desirable that power plants designed for such uses be capable of long periods of unattended operation. Achieving such a goal is facilitated by designing the power conversion system so that it is lubricated by the working substance itself and as a result the unit may be hermetically sealed.

One type of nuclear reactor which may be utilized in such power plants is an inherently safe boiling water nuclear reactor known generally as "Triga." A particular model of this type of reactor designed for the production of power is described in U.S. Pat. No. 3,296,083, issued Jan. 3, 1967. As therein described, the reactor forms part of a power plant. The mixture of steam and water produced by the reactor is separated into its two phases and the dry saturated steam is used to drive a steam turbine, while the water is recycled through the reactor.

A particular problem is utilizing such a water cooled reactor to produce relatively small quantities of power by means of a steam turbine is that the energy supplied by the reactor to the power conversion system is primarily in the form of the thermal energy of steam. The latent heat of the steam, which must be rejected to the heat sink by the power conversion system, is relatively high. For maximum thermal efficiency, therefore, high turbine inlet pressures and temperatures and low turbine exhaust pressures are required. To achieve such characteristics a single stage turbine is ordinarily not adequate. Large central power plants utilize turbines with a large number of stages in series, exhaust the condensed steam every few stages and use regenerative feed water heating to reduce the amount of heat rejected. These expedients, however, are not desirable for a small power plant in which compactness is also a goal.

A related problem for compact turbines with small diameters such as might be used in such a power plant is that extremely high rotative speeds are required to maximize efficiency. This presents problems in the production of alternating current electrical power at relatively low conventional line frequencies. Hence, for small turbogenerators step down gears are often used to connect the turbine and alternator. This expedient, of course, also reduces efficiency and introduces mechanical complexity. Alternatively, solid state frequency conversion devices could be used to convert the output of a high speed alternator to the desired frequency. Development and testing of such a system would require a large and expensive investment in the present state of the art.

Thus it may be seen that in the particular situation just presented, the development of small scale power plants, the energy which enters the system in the form of the thermal energy of steam is best utilized by high speed turbines, yet the desired energy output of alternating electrical current of conventional line frequencies is best produced by low speed alternators. Similar problems might arise in the converse use of a power conversion system, i.e., where the desired output is not electrical energy but rather a change in the energy, thermal or internal of a working substance. In such cases the desired work might best be performed by one type of machine while the input energy might best be utilized by another form of machine.

Accordingly it is an important object of the present invention to provide a power conversion system with which incompatibilities between the characteristics of the energy which enters the system and the desired output may be overcome.

Another object of the invention is to provide a compact power conversion system particularly adapted for use in a small scale power plant.

A further object of the invention is to provide a power conversion system which is especially suitable for use with relatively small nuclear reactors and particularly with a boiling water reactor which produces superheated steam as a working fluid.

A still further object of the invention is to provide a power conversion system which employs lubrication by the working substance or process fluid itself thus permitting a hermetically sealed system.

Yet another object of the invention is to provide a power conversion system which is controlled by simple means and is adapted to operate unattended for long periods of time.

Still another object of the invention is to provide a power conversion system which utilizes readily available components not requiring a great deal of development or testing to combine into an efficient and practical solution to the problem of input and output incompatibilities.

Other objects and advantages of the invention will become apparent from the following description taken in conjunction with the drawing in which:

The FIGURE is a schematic view of a power plant illustrating the power conversion system of the present invention.

In general, the drawing illustrates a nuclear-electrical power plant including a preferred embodiment of an improved power conversion system. The illustrated power conversion system includes a first power conversion subsystem which comprises first energy conversion means in the form of a plurality of steam turbines operating at various pressures which convert thermal and pressure energy into rotational kinetic energy. The chambers of the steam turbines are connected in series with one another along a circulating loop for the working fluid and serially interact therewith. Each of the turbines directly drives second energy conversion means in the form of a water pump which forms part of a second power conversion subsystem. The water pumps are connected in parallel with one another in another fluid circulating loop and thus interact with the fluid in parallel and convert kinetic energy into pressure energy by creating a pressure head. The pressure energy is used to drive a third energy conversion means in the form of a water turbine so as to produce mechanical kinetic energy. The water turbine device to an alternator which produces electrical power.

The following detailed description of the improved power conversion system will be premised on the utilization of the system in conjunction with a boiling water reactor of the "Triga" type, as exemplified by the aforementioned U.S. Pat. No. 3,296,083, to produce electrical power. However, it should be emphasized that other sources of thermal energy might be utilized including conventional fossil fueled boilers as well as nuclear reactors. Furthermore, the working substance in both subsystems of the power conversion unit might be substances other than water and need not necessarily even be the same substance. Use of the same substance in both subsystems facilitates lubrication by the working fluid, however. Moreover the operation of the power conversion system might be reversed so as to convert mechanical energy put into the second subsystem into internal or thermal energy by performing work on a fluid in the first power conversion subsystem such as by compressing a gas.

Referring now more particularly to the FIGURE, there is disclosed a nuclear reactor 10 which functions as a source of thermal energy, a power conversion system 12 which converts the thermal energy into a desired form of mechanical energy and an alternator 14 driven by the power conversion system 12 which produces the desired output, in this case alternating electrical current.

The reactor 10 preferably is the aforementioned "Triga" power reactor enclosed in a pressure vessel 16 which is supplied with cooling water through an inlet 18. The water is heated as it passes through the reactor 10 and leaves the pressure vessel 16 through an outlet 20 in the form of a mixture of water and steam. As shown, the mixture passes immediately to a first liquid-vapor separator 22 where the two phases of the mixture are separated. The liquid is recirculated to the reactor 10 through an exhaust conduit 24 and a feed water heater 26. The saturated steam produced by the first liquid vapor separator 22 functions as a working substance in the power conversion system and is circulated into the power conversion system 12 via a high pressure steam conduit 28 as will be described in detail hereinafter.

As illustrated the reactor is operated under boiling conditions and with natural convection, the rate of circulation being determined by the conditions of operation of the reactor and the feed water heater, including the amount and condition of water supplied thereto. However, forced circulation could also be utilized. Although saturated steam is the working fluid supplied to the power conversion system, superheated steam could be employed by passing the dry steam from the first liquid-vapor separator 22 back through a suitable superheater (not shown) in the pressure vessel 16. Also the reactor could itself generate steam in the super critical range. Furthermore, as previously noted, working fluids other than water might be utilized for the power conversion system, in which case a heat exchanger would be required if the working fluid were not the same fluid as the reactor coolant. However, the power plant may be made more compact by circulating the same fluid through both the reactor and the power conversion system.

The power conversion system 12 comprises two power conversion subsystems 30 and 32 directly mechanically coupled to one another. The first subsystem 30 utilizes as a "first" working fluid the saturated steam supplied from the illustrated liquid vapor separator 22. The second subsystem 32 utilizes water as its "second" working fluid. It should be apparent from the prior discussion that the use of the adjectives "first" and "second" with respect to the power conversion subsystems and working fluids are not intended to imply particular directions of transfer of energy through the entire system, but only to distinguish the two subsystems and fluids from one another, since the invention is believed to be broad enough to encompass the transfer of energy in either direction.

The illustrated first power conversion subsystem 30 generally comprises a high pressure steam turbine 34, which receives steam from the high pressure steam conduit 28 and a low pressure steam turbine 36.

The chambers of the two steam turbines are connected in series with one another by an exhaust conduit 38 at the outlet of the high pressure turbine which leads to a second liquid-vapor separator 40 and by a low pressure steam conduit 42 which leads from the separator 40 to the low pressure steam turbine. The high pressure steam from the conduit 28 drives the high pressure steam turbine causing its output shaft 44 to rotate. Thermal energy of the steam thereby is transformed into the kinetic energy of rotation of the drive shaft. The mixture of water and steam thus produced by this transformation is then conducted to the second liquid vapor separator 40 which separates the mixture into its two phases. The resulting low pressure steam is then transmitted through the low pressure steam conduit 42 to the chamber of the low pressure steam turbine.

As in the high pressure steam turbine, the steam entering the illustrated low pressure turbine causes an output shaft 46 to rotate, transforming thermal energy into kinetic energy of rotation. As shown, the exhausted steam-water mixture is transmitted from the exit of the low pressure turbine 36 via a suitable exhaust conduit 48 to a condenser 50, where the working fluid is condensed into the liquid state.

As illustrated, liquid conduits 52 and 54 conduct the liquid products of the second liquid vapor separator 40 and the condenser 50, respectively, into a common conduit 56 and thence to a boiler feed pump 58. The boiler feed pump pumps water via a supply conduit 62 to the feed water heater 26 for circulating through the reactor 10, thus completing the circulatory cycle. The boiler feed pump may be independently driven by a motor 63 or by another steam turbine (not shown) in series with the main turbines 34 and 36.

As previously noted the illustrated second power conversion subsystem utilizes a liquid as its working fluid, preferably water when the working substance of the first subsystem is steam. However, other working substances might be utilized depending upon the desired output and the form of the input energy. The second subsystem, as shown, includes two water pumps 64 and 66 each of which is directly mechanically driven by one of the respective output shafts 44 and 46 of the two steam turbines 34 and 36. The output shafts 44 and 46 are rigidly connected to or integral with the impeller drive shafts 68 and 70, respectively, of the water pumps. The two pumps need not be designed to operate at the same speed but the pump impellers should have appropriately different diameters if the speeds are different so that the pressure heads developed by both are the same. Single stage axial or centrifugal pumps are suitable with water lubricated bearings. The chambers of the water pumps are arranged in parallel with one another; that is, water is supplied from a common supply conduit 72, through respective pump supply conduits 74 and 76, to the impeller chambers.

Water flowing into the pumps receives energy from the rotating impeller vanes which results in an increase in pressure head. Thus the rotating kinetic energy of the steam turbine output shafts is transformed into mechanical pressure type energy in the second power conversion subsystem. Discharge conduits 78 and 80 transmit the high pressure water discharged by the pumps to a common discharge conduit 82, which channels the water into the inlet of a water turbine 84. Passage of the water through the water turbine 84 rotates an output shaft 86 thus converting the pressure energy of the working fluid into rotational kinetic energy.

As illustrated the drive shaft of the alternator 14, is directly connected to the turbine output shaft so that the shafts' rotation produces electrical power. It may be seen that since conventional water turbines are normally most efficient at relatively low speeds compared to steam turbines, it is much easier to construct a system in which the alternator will rotate at a relatively low frequency compared to the conventional line frequencies desired as the output, and production of current at such frequencies is facilitated. A typical operating speed for the water turbine may be 3,600 r.p.m.

A turbine discharge conduit 88 leads from the outlet of the water turbine chamber to the common supply conduit 72 to complete the second working fluid circulatory cycle. However, in order to control the flow of water through this second subsystem, and, hence, the output power, a water bypass valve 90 connects the common discharge conduit 82 on the inlet end of the turbine with the turbine discharge conduit 88. Actuation of the bypass valve 90 diverts water from the water turbine 84 and recycles it through the pumps 64 and 66 thereby diminishing the output power as desired.

Operating pressure in the water carrying conduits of the entire system is maintained by a pressurization line 92 connected to both the common water supply line 72 in the second power conversion subsystem and the feed water heater supply conduit 62 in the first power conversion system. A lubricant supply line 94 comprising lubricating means 95 supplies the water lubricant to the output and drive shafts during start-up operations. Thereafter the water in the power conversion system itself performs this function. By this means, a process fluid lubrication is provided which permits the entire system to be hermetically sealed and function for long periods of time unattended.

Thus it may be seen that a power conversion system has been provided which utilizes input energy in the form of the thermal energy of high pressure steam to drive steam turbines at the relatively high speeds where they are most efficient. The kinetic energy thus produced is transformed into pressure energy which in turn is used to drive a water turbine at a relatively low speed where it in turn is most efficient. The water turbine powers an alternator to produce appropriate relatively low frequency electrical power which is the desired output, without requiring complex solid state frequency conversion devices. The incompatibilities between the input and output have thereby been overcome. The entire system may be constructed utilizing relatively simple state of the art components without extensive development.

It will also be readily appreciated that the direction of transfer of energy could be reversed in the system. For example, the illustrated alternator could be replaced by an electric powered motor which would impart pressure energy to a first working liquid. This liquid in turn could be used to power engines arranged in parallel which are directly mechanically coupled to other engines connected so as to operate in series on a second working substance, such as gas which might be compressed.

Various other changes and modifications might be made in the above described power conversion system without departing from the invention. For example, the turbines and pumps might be increased in number and the working fluids could be different from those specifically disclosed, all of which would fall within the spirit and scope of the invention, various features of which are set forth in the accompanying claims.

What I claim is:

1. A power conversion system for converting energy between the form of thermal energy and the form of mechanical energy comprising a first power conversion subsystem adapted to operate on a first working fluid including a plurality of first energy conversion means adapted to convert energy between the forms of thermal and pressure energy of said first working fluid supplied thereto and the form of kinetic energy of said first energy conversion means, and first fluid transmission means connecting said first energy conversion means in series with one another for circulating said first working fluid in series through said first energy conversion means; and a second subsystem adapted to operate on a second working fluid including a plurality of second energy conversion means adapted to convert energy between the form of kinetic energy of said second energy conversion means and the form of pressure energy of said second working fluid, second fluid transmission means connecting said second energy conversion means with one another in parallel for circulating said second working fluid in parallel through said second energy conversion means; and energy transmission means mechanically connecting said first energy conversion means with said respective second energy conversion means for transmitting kinetic energy between said first subsystem and said second subsystem.

2. A system in accordance with claim 1 including third energy conversion means connected to said second fluid transmission means for converting energy between the form of pressure energy of said second working fluid and kinetic energy of said third energy conversion means.

3. A system in accordance with claim 1 wherein said first working fluid is a vapor.

4. A system in accordance with claim 3 wherein said vapor is superheated steam.

5. A system in accordance with claim 1 wherein said second working fluid is a liquid.

6. A system in accordance with claim 5 wherein said liquid is water.

7. A system in accordance with claim 1 wherein said first working fluid is steam and said first conversion means are steam turbines driven by said steam.

8. A system in accordance with claim 1 wherein thermal energy is applied to said power conversion system from a nuclear reactor.

9. A system in accordance with claim 8 wherein said first working fluid cools said nuclear reactor.

10. A system in accordance with claim 1 wherein said second working fluid is water and said second conversion means are water pumps.

11. A system in accordance with claim 2 wherein said third energy conversion means is a water turbine.

12. A system in accordance with claim 11 wherein said water turbine drives an electrical alternator to produce alternating electrical current.

13. A system in accordance with claim 11 including control means coupled between the inlet of said pumps and the inlet of said water turbine.

14. A system in accordance with claim 13 wherein said control means is a bypass valve for diverting water from said water turbine.

15. A system in accordance with claim 1 wherein said first working fluid is steam, said first energy conversion means are steam turbines with output shafts, said second working fluid in water and said second energy conversion means are water pumps with drive shafts directly driven by said output shafts of said steam turbines.

16. A system in accordance with claim 1 including conduit means adapted to supply said working fluids to said energy transmission means whereby said working fluids lubricate said energy transmission means.